US007334252B1

(12) United States Patent
Millet et al.

(10) Patent No.: US 7,334,252 B1
(45) Date of Patent: Feb. 19, 2008

(54) RAPID CABLE MODEM RE-PROVISIONING IN A CABLE NETWORK

(75) Inventors: Mark Millet, Mountain View, CA (US); Guenter E. Roeck, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1290 days.

(21) Appl. No.: 09/687,297

(22) Filed: Oct. 13, 2000

(51) Int. Cl.
*H04N 7/173* (2006.01)
*H04L 12/28* (2006.01)
*H04L 12/56* (2006.01)

(52) U.S. Cl. ............... 725/111; 370/395.2; 370/395.21

(58) Field of Classification Search ................. 725/111
See application file for complete search history.

(56) References Cited

U.S. PATENT DOCUMENTS

| 5,862,451 | A | | 1/1999 | Grau et al. ................... 455/5.1 |
| 6,023,464 | A | * | 2/2000 | Woundy ...................... 370/352 |
| 6,986,157 | B1 | * | 1/2006 | Fijolek et al. .............. 725/111 |

OTHER PUBLICATIONS

DOCSIS Radio Frequency Interface Specification (SP-RFI-104-980724), published in Jul. 24, 1998.*

* cited by examiner

Primary Examiner—Chris Kelley
Assistant Examiner—Usha Raman
(74) Attorney, Agent, or Firm—Beyer Weaver LLP (57) ABSTRACT

Methods, systems, and computer program products are disclosed for allowing rapid re-provisioning of a cable modem at the MAC/physical layer in a cable modem network. After a cable modem goes through power-up/self-test, i.e., a hard boot, and goes through initial provisioning, the modem is in a steady state in which standard DOCSIS periodic ranging is performed. It is during periodic ranging that the provisioning status, such as bit rate, ISP, etc., can be rapidly changed to allow for "on the fly" changes in provisioning. A cable modem is synchronized with the cable modem network. The modem is then provisioned once it receives a configuration file from a provisioning system. Periodic ranging is then performed between the modem and the CMTS, located either in a headend or a fiber node in the cable plant. The periodic ranging is interrupted by a command or action taken by the CMTS on the cable modem instead of the modem being affected directly by the provisioning system. Once periodic ranging is broken, either by cessation of polling messages or a ranging abort command, the modem goes directly to re-synchronizing with the cable network and re-provisions, i.e., avoids performing a power-on/self test or hard boot.

28 Claims, 7 Drawing Sheets

RAPID CABLE MODEM RE-PROVISIONING IN A CABLE NETWORK

BACKGROUND OF THE INVENTION

1. Field of the Invention

The present invention relates generally to cable modems and data transmission in cable modem networks. More specifically, it relates to rapid re-provisioning of a cable modem on demand without having to go through a start-up procedure.

2. Discussion of Related Art

Since the late 1980's the cable TV industry has been upgrading its signal distribution and transmission infrastructure. In many cable television markets, the infrastructure and topology of cable systems now include fiber optics as part of its signal transmission component. The use of fiber optics has accelerated the pace at which the cable industry has taken advantage of the inherent two-way communication capability of cable systems. The cable industry is now poised to develop reliable and efficient two-way transmission of digital data over its cable lines at speeds orders of magnitude faster than those available through telephone lines, thereby allowing its subscribers to access digital data for uses ranging from Internet access to cable commuting. While cable TV systems have always had the ability to send data downstream, i.e. from a cable TV hub, described below, to cable modems in people's homes, cable TV systems can now send data upstream, i.e. from individual cable modems to a hub. This new upstream data transmission capability enabled cable companies to use set-top cable boxes and provided subscribers with "pay-per-view" functionality, i.e. a service allowing subscribers to send a signal to the cable system indicating that they want to see a certain program.

Figure 1:
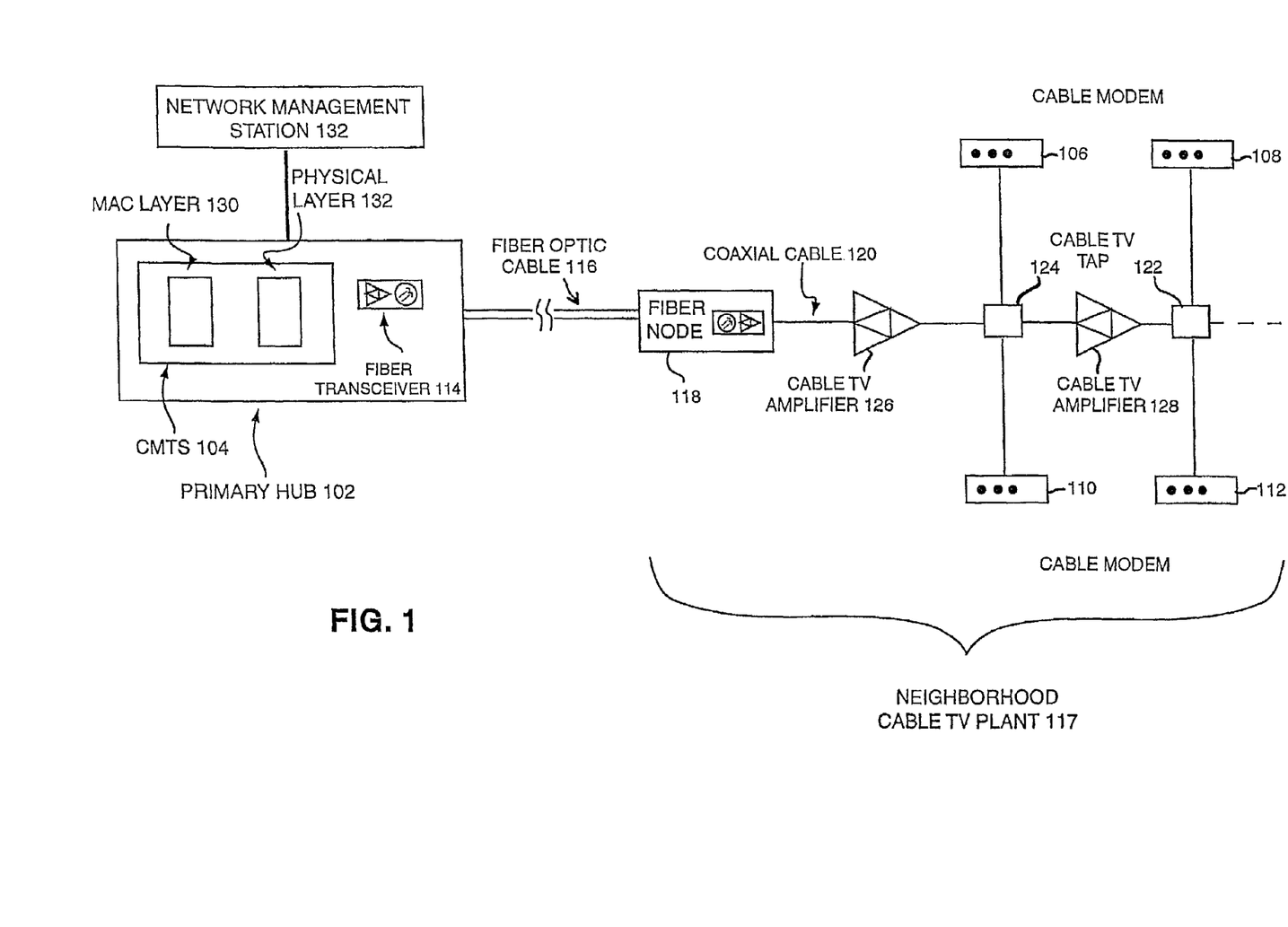
FIG. 1 is a block diagram of a two-way hybrid fiber-coaxial (HFC) cable system including cable modems and a network management station.

FIG. 1 is a block diagram of a two-way hybrid fiber-coaxial (HFC) cable system including cable modems and a network management station. The main distribution component of an HFC cable system is a primary (or secondary) hub 102 which can typically service about 40,000 subscribers or end-users. Hub 102 contains several components of which two, relevant to this discussion, are shown in FIG. 1. In one configuration, one of the components is a cable modem termination system, or CMTS, 104 needed when transmitting data (sending it downstream to users) and receiving data (receiving upstream data originating from users) using cable modems, shown as boxes 106, 108, 110, and 112. In another configuration, the CMTS can be outside the hub and located in a fiber node. The other component is a fiber transceiver 114 used to convert electrical signals to optical signals for transmission over a fiber optic cable 116. Fiber optic cable 116 can typically run for as long as 100 km and is used to carry data (in one direction) for most of the distance between hub 102 to a neighborhood cable TV plant 117. More specifically, fiber optic cable 116 is a pair of cables—each one carrying data in one direction. When the data reaches a particular neighborhood cable TV plant 117, a fiber node 118 converts the data so that it can be transmitted as electrical signals over a conventional coaxial cable 120, also referred to as a trunk line. Fiber transceiver 114 can be replaced by an RF translator or other device for converting to broadband or over-the-air (wireless) frequencies, and any antenna device (wireless radiator). Fiber optic cable 116 can also be any wireless link, over-the-air connection, or other free space optical link. Fiber node 118 can also be an RF translator or other device or an antenna device (wireless radiator) from converting from broadband or over-the-air (wireless) frequencies back to frequencies compatible with a cable modem. Fiber transceiver 114 can be integrated into the CMTS or a cable modem device. Many of these substitutions would effectively leave the topology of the cable modem network unchanged. Hub 102 can typically support up to 80 fiber nodes and each fiber node can support up to 500 or more subscribers. Thus, there are normally multiple fiber optic cables emanating from hub 102 to an equal number of fiber nodes. In addition, the number of subscribers as well as fiber capacity is currently increasing due to dense wave-division multiplexing technology. DWDM is a technique for transmitting on more than one wavelength of light on the same fiber.

The primary functions of CMTS 104 are (1) interfacing to a two-way data communications network; (2) providing appropriate media access control or MAC level packet headers (described below) for data on the RF interface of a cable system; and (3) modulating and demodulating the data to and from the cable system.

Cable TV (CTV) taps 122 and 124 are used to distribute a data signal to individual cable modems 106 and 110 (from CTV tap 124) and modems 108 and 112 (from CTV tap 122). Two-way cable TV amplifiers 126 and 128 are used to amplify signals as they are carried over coaxial cable 120. Data can be received by the cable modems shown (each CTV tap can have output cables servicing multiple cable modems) and transmitted back to hub 102. In cable systems, digital data is carried over radio frequency (RF) carrier signals. Cable modems are devices that modulate a digital signal to an RF signal and demodulate an RF signal to a digital signal for transmission over a coaxial cable. This modulation/demodulation is done at two points: by a cable modem at the subscriber's home and by CMTS 104 located at hub 102. If CMTS 104 receives digital data, for example from the Internet, it converts the digital data to a modulated RF signal which is carried over the fiber and coaxial lines to the subscriber premises. A cable modem then demodulates the RF signal and feeds the digital data to a computer (not shown). On the return path, the operations are reversed. The digital data is fed to the cable modem which converts it to a modulated RF signal. Once CMTS 104 receives the RF signal, it demodulates it and transmits the digital data to an external source. It should be noted that several of the components described above, including CTV 122 and 124 and amplifier 126, can be replaced or eliminated depending on the necessary topology or requirements of a particular cable modem network.

Data packets are addressed to specific modems or to a hub (if sent upstream) by a MAC layer 130 in CMTS 104 at hub 102 (there is also a MAC addressing component, not shown, in the cable modems that encapsulate data with a header containing the address of the hub when data is being sent upstream). CMTS 104 has a physical layer 132 that is responsible for keeping a list of modem addresses and encapsulating data with appropriate address of its destination. MAC layer 130 receives data packets from a Data Network Interface (not shown) in hub 102. The main purpose of MAC layer 130 is to encapsulate a data packet within a MAC header according to the DOCSIS standard for transmission of data. This standard is currently a draft recommendation (J.isc Annex B) which has been publicly presented to Study Group 9 of the ITU in October 1997, and is known to a person in the cable modem data communication field. MAC layer 130 contains the necessary logic to encapsulate data with the appropriate MAC addresses of the cable modems on the system. Each cable modem on the system has its own MAC address. Whenever a new cable modem is installed, its address must be registered with MAC layer 130. The MAC address is necessary to distinguish data going from the cable modems since all modems share a common upstream path, and so that CMTS 104 knows where to send data. Thus, data packets, regardless of format, must be mapped to a particular MAC address. MAC layer 130 is also responsible for sending out polling messages as part of the link protocol between the CMTS and the cable modems that is necessary to maintain a communication connection between the two.

Cable modems receive configuration files and are provisioned based on data in such configuration files. Provisioning a cable modem can be defined as reconfiguring the operational parameters of the modem. By provisioning a cable modem, the network is establishing the allocation of resources to a particular cable modem in a cable modem network. A DOCSIS-compliant cable modem receives a configuration file during initial provisioning (described below) which contains data such as ISP, quality of service, data rate, number of PCs that can use the modem, and similar data. Current methods of provisioning a cable modem take more time than is desirable (up to four minutes) and is disruptive to the customer. Cable modem users typically do not want to wait that long for a provisioning change in their modem. For example, telephone customers can now change carriers for a particular call by dialing a special number (e.g., 10-10-321) and the change in service is almost instantaneous. Presently, if a customer wants a provisioning change, the cable modem must be reloaded or rebooted, thus taking the cable modem offline.

There are a number of reasons why a cable modem user, a cable network operator, or a cable network ISP may want to re-provision a cable modem. For example, a user may want to receive or transmit an unusually large file and, therefore, will want to increase the bandwidth of the downstream or upstream carrier to accommodate the large file but then return to the normal bandwidth. In another example, a user may be playing a game online and may want to use a different ISP for better performance. The user may want to switch to a premium service from standard service for a limited time (e.g., for a few minutes, hours, a day) or for a single transmission. A cable network operator or ISP may want to provision a particular cable modem because that modem experienced an unexpected or unexplainable fault and cannot be recovered using normal methods. For example, a problematic cable modem may not be rebootable or restartable using routine hardware approaches of powering up the modem. In another example, the cable modem may have been tampered with by the user and can only be repaired by the network operator by re-provisioning the cable modem. However, in some cases re-provisioning the cable modem is not possible using the typical route of reloading or rebooting the cable modem using the normal DOCSIS approach. These normal approaches involve sending a Layer 3 IP system command, such as an SNMP command, to the cable modem.

Therefore, it would be desirable to have a more rapid and less disruptive process for re-provisioning a customer cable modem that does not take the cable modem offline or cause it to reboot. It would be desirable to do so by using existing tools and commands in the existing standard. Furthermore, it would be desirable to allow a cable modem customer to provision a modem on demand to suit the customer's needs.

SUMMARY OF THE INVENTION

In one aspect of the present invention a method of rapidly changing the provisioning status of a cable modem from a CMTS in a cable modem network is described. During provisioning of a modem, the modem receives DHCP data, time of day (TOD), security states, configuration files, and QOS parameters. The configuration files determine the level of service the modem or user is entitled to. The modem is connected to a cable modem termination system (CMTS) which is associated with a provisioning system. After the modem goes through a cold or hard boot, the modem synchronizes with the cable modem network. The modem then goes through initial provisioning at which time it receives a configuration file. The modem then goes into a steady state and performs periodic ranging with the CMTS. This periodic ranging is then interrupted thereby causing the cable modem to return directly to re-synchronizing with the network and re-provisioning where it receives a new configuration file.

By going straight to synchronization and provisioning, the modem avoids having to perform a cold or hard boot, such as a power-on/self-test or initialization procedure, reducing the time for re-provisioning from several minutes to a few seconds. In addition, the commands for breaking the periodic ranging chain in the modem come from the CMTS instead of directly from the provisioning system. In one embodiment, the CMTS discontinues sending normal ranging opportunity messages to the cable modem. When the modem realizes it has not received a ranging opportunity (typically within 30 seconds), it is knocked offline and goes straight to initial provisioning, avoiding a hard boot. In another embodiment, the CMTS sends a ranging abort message to the modem causing the modem to perceive a CMTS decreed RF failure. The ranging abort message is sent in place of a ranging response message to the cable modem, as the modem would normally except to receive during periodic ranging. Once the modem experiences an RF failure, it goes directly to initial provisioning, at which point the provisioning system can send it a new configuration file, thereby re-provisioning the modem. By using such commands to break the periodic ranging chain, the modem is being re-provisioned at a MAC/physical layer instead of the normal software or IP layer.

In another aspect of the present invention, a system for changing the provisioning status of a cable modem in a cable modem network having a cable modem termination system (CMTS) and a provisioning system is described. The system includes a modem synchronization component for synchronizing a cable modem with the network. An initial configuration file is sent to the cable modem causing the modem to perform initial provisioning. The system also includes multiple polling messages exchanged between the modem and the CMTS for performing periodic ranging. The system also includes a modem reset command that is transmitted to the CMTS. This causes the CMTS to interrupt the periodic ranging with the modem thereby forcing the cable modem to invoke the modem synchronization component and receive a different configuration file reflecting the desired provisioning status of the modem.

BRIEF DESCRIPTION OF THE DRAWINGS

The invention will be better understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method of significantly speeding up a change in the provisioning status of a customer cable modem is described in the various figures. The provisioning status of a cable modem is the total pool of resources in the network infrastructure allocated to a particular modem at a particular time. By changing the provisioning status, the network changes how a customer gets Internet access over the cable network. For example, a customer may decide to use another ISP for one hour or for downloading one particularly large file which needs to be downloaded quickly. In other situations, the cable network operator may want to discontinue service to a particular customer. In order to do this, the provisioning status of the customer must be changed.

The present invention describes methods of having the CMTS "knock offline" a cable modem at the MAC/physical layer without disrupting services to other modems. This is done by interrupting the periodic ranging of the cable modem so the modem loses its synchronization with the network. More specifically, this soft reboot of a cable modem is implemented using a clear modem reset command sent from the provisioning system to the CMTS instead of to the cable modem. In a preferred embodiment, this clear modem reset command results in the discontinuance of the transmission of periodic ranging opportunities to the modem. Another method of rapidly changing the provisioning status is having the CMTS send a ranging abort message to the modem in place of a range response message during periodic ranging. This causes an RF failure in the modem and effectively cuts off the periodic ranging messages to the cable modem. After either of these interruptions, a DOCSIS-compliant modem must restart the DOCSIS registration procedure and repeat the DHCP process. However, the power-up/self-test step does not have to be performed. That is, the cable modem performs a warm boot. At this time, the DHCP server or provisioning system can provide updated provisioning information, reconfiguring the modem as desired. By performing a rapid warm boot, the modem user can change the provisioning status of the modem typically within a few seconds.

In the present invention, a modem's provisioning status is changed by using tools and commands that already exist in the physical layer and the provisioning system of the cable modem network. The physical layer contains a control structure for maintaining the RF link integrity between the modem and the cable modem termination system (CMTS) at the headend of the cable plant according to standard DOCSIS 1.0. These tools and commands are used to cause an interruption or break in the cable modem's periodic ranging, a function of the MAC/physical layer of the cable network. In the described embodiment, the periodic ranging chain is broken by having the CMTS stop sending ranging opportunities to the cable modem. This is triggered by sending a "clear cable modem reset" command from the provisioning system to the CMTS. The clear cable modem reset command can be sent via a Layer 3 Simple Network Management Protocol (SNMP) command or via a command line interface. Using an SNMP command directed to the CMTS to break periodic ranging of a cable modem and causing a re-provision is faster than directing the command to the cable modem, which causes the cable modem to go through a hard reboot. An SNMP reset of the cable modem itself takes up to four minutes which is too long to allow customers to re-provision on the fly. The other way to break periodic ranging is to allow a DHCP lease to expire which can take several days and, thus, not practical for rapid provisioning.

With the present invention, periodic ranging is broken using a physical layer solution instead of an IP layer solution. Presently, the provisioning status, including QOS parameters, are changed by sending an SMNP command to reload the modem. How a customer gets service over the Internet via a cable modem can be referred to as quality of service (QOS) parameters.

Figure 2:
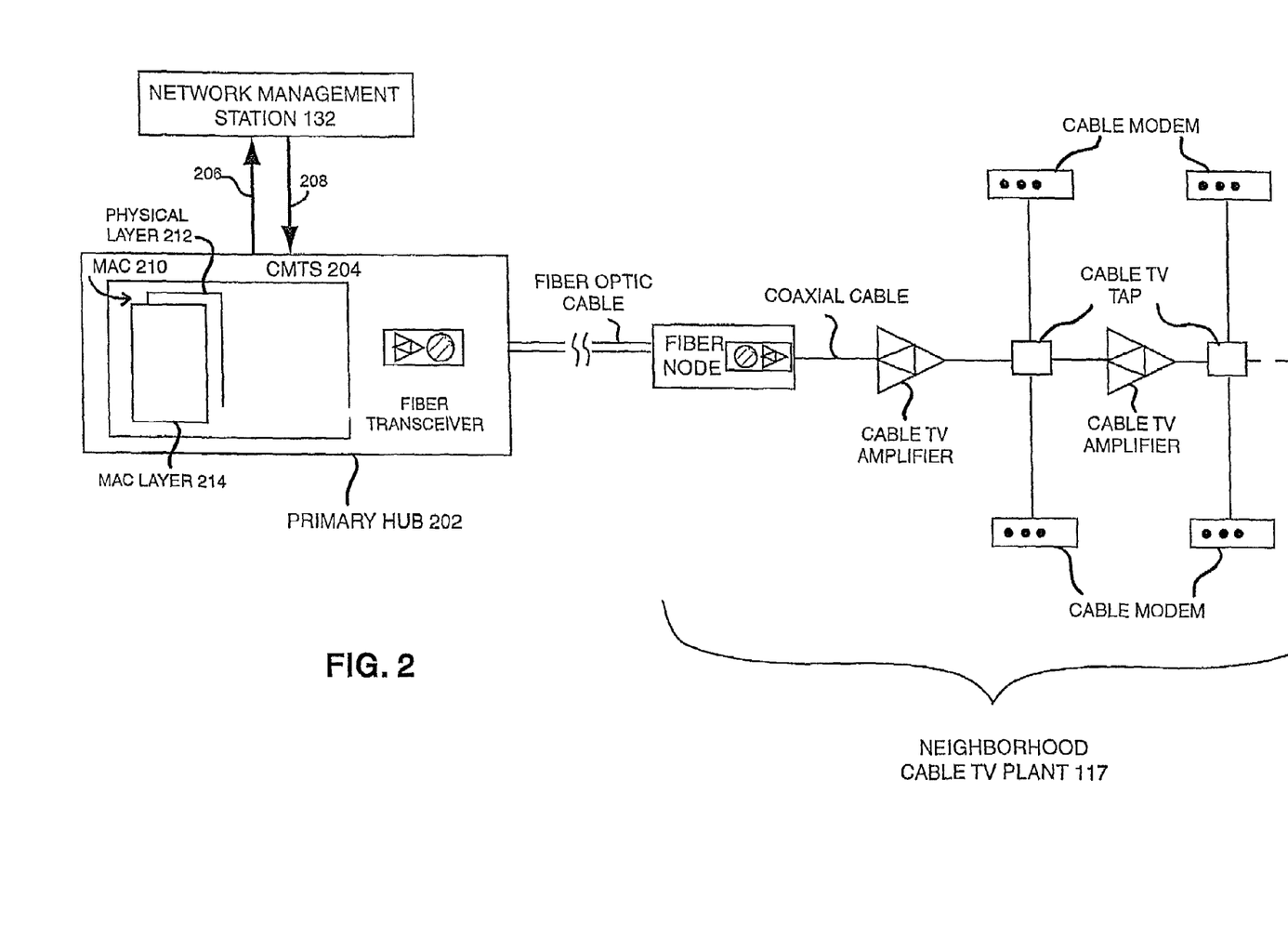
FIG. 2 is a block diagram of components in an HFC cable TV system in accordance with a preferred embodiment of the present invention.

Before describing the rapid re-provisioning processes of the present invention, it is useful to briefly describe some specific components of the HFC cable plant. FIG. 2 is a block diagram of components in an HFC cable TV system in accordance with a preferred embodiment of the present invention. Many of the components shown in FIG. 2 are the same as those in FIG. 1. In a preferred embodiment, all the components in neighborhood cable TV plant 117 are the same. These components include cable modems, CATV taps, CATV amplifiers, and fiber nodes. Within the CATV hub is a CMTS and fiber transceiver, among other components well known in the art. Emanating from the hub are a series of fiber optic cables, of which one pair is shown in FIG. 2, connected to a fiber node. As mentioned earlier, a hub can support typically up to 80 fiber nodes. A fiber node converts the optical signal to an electrical signal for transmission over a coaxial cable to CTV taps for distribution to individual cable modems.

Also shown in FIG. 2 is a network management station 132 connected to a hub 202 or, more specifically, a CMTS 204. CMTS 204 includes a MAC component 210 which encapsulates data packets with a MAC header containing a destination address of a cable modem. One component of CMTS 204 is a physical layer 212 to maintain a communication link between CMTS 204 and all the cable modems it supports. As explained below, it does this by receiving polling messages from cable modems at predetermined times.

Figure 3A:
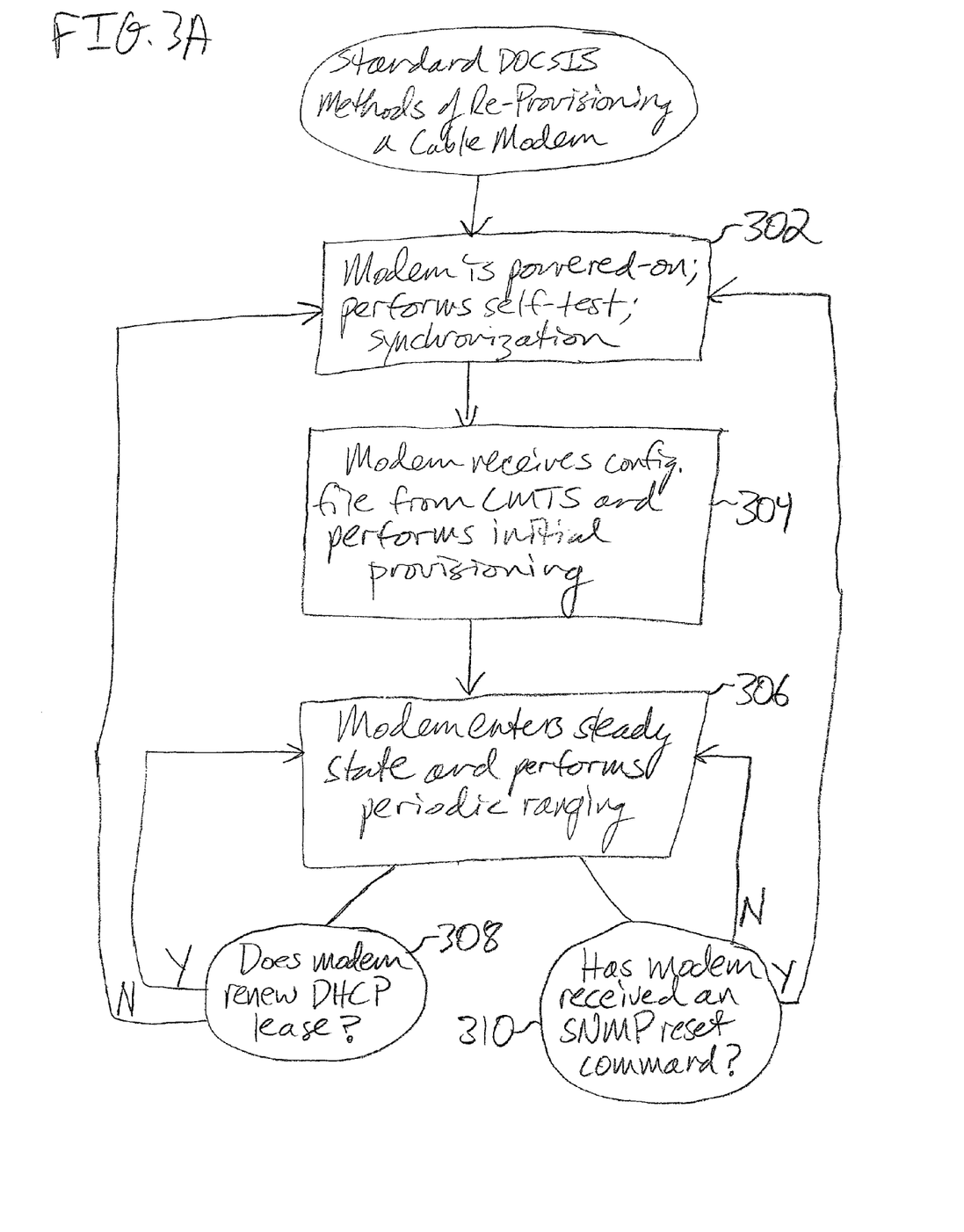
FIG. 3A is a flow diagram of the standard DOCSIS approach to changing the provisioning status of a cable modem.

FIG. 3A is a flow diagram of the standard DOCSIS approach to changing the provisioning status of a cable modem. More generally, FIG. 3A shows when a cable modem needs to reboot and, in the process, has an opportunity to change its provisioning status or QOS parameters. In the standard DOCSIS approach, there are at least two ways a modem can be re-provisioned. These two approaches are described in FIG. 3A. One approach involves sending an SNMP reset command directly to the cable modem, causing it to perform a hard reboot. This hard reboot allows a change in the provisioning of the cable modem. This can be seen as an IP layer approach to rebooting the cable modem and can take up to four minutes. A "clear cable modem" reset command is sent via SNMP, a Layer 3 IP command, from the provisioning system (the OSS layer or a billing support system of the cable network) to the cable modem. The other approach is to allow the cable modem's DHCP lease to expire by not renewing it in time. When the modem is unable to renew its DHCP lease, it must perform a hard reboot. This approach can take several days since a typical DHCP lease lasts for seven days.

At a step 302 the cable modem is powered on and performs a self-test. The modem acquires a downstream QAM carrier, an upstream carrier, its quality of service (QOS) parameters, and goes through synchronization. The time needed for a self-test varies with different DOCSIS-compliant modems, but is typically in the range of four minutes. The modem can be powered on by a customer or by a cable network operator. As will be described below, one of the differences in the processes of the present invention is that this power-on/self-test step is avoided.

At a step 304 the cable modem receives a configuration file from the CMTS and goes through initial provisioning. This is standard for DOCSIS-compliant modems and is well known in the field of cable modem networks. At initial provisioning the modem downloads its DHCP data, time of day (TOD), security states, configuration files, and QOS parameters. It also performs initial ranging, described below. At this stage, the modem is allocated a set of resources which it can use to send and receive data, such as an upstream carrier and bit rate. Initial provisioning typically takes about 30 seconds.

As is known in the field, during initial provisioning, the cable modem sends an initial maintenance message to the CMTS. By doing so, the modem tells the CMTS that the modem wants to be inserted into a polling list and be issued a time interval in which the modem can send a polling message to the CMTS. The CMTS then sends an initial ranging response message to the cable modem. The initial ranging response message to the cable modem acknowledges receipt of the initial registration message at the CMTS and instructs the cable modem to perform timing, power, and frequency adjustments to modem's transmitter. This process completes the initial ranging or initial provisioning of the cable modem. When a cable modem goes straight to initial provisioning from its normal operation (i.e., steady state), without doing a power-on/self-test (step 302), the modem has performed a warm reboot.

As described above, a cable modem is linked or connected to a CMTS housed in a primary or secondary hub through coaxial and fiber optic cables. A communication link protocol maintains the connections and ensures that the link between a cable modem and the CMTS is up. More specifically, the MAC/physical layer in the CMTS communicates with the MAC/physical layer in the cable modem. This is referred to as periodic ranging, described in greater detail below, and is also well known in the field of cable modem networks. At a step 306 the modem goes into steady state and performs periodic ranging. This step is described in greater detail in FIG. 3B.

During step 306 while the modem is in steady state, the modem checks its DHCP lease periodically. This is shown separately at step 308. The modem's DHCP lease is typically renewed halfway through its current lease, i.e., at about three days. If the cable operator or cable user wants to re-provision the cable modem, he or she can intentionally not renew the DHCP lease. By doing so, the DHCP lease expires and the modem has to go through power-on/self-test again and, thus, can change it provisioning status. However, this approach to changing provisioning status can take several days and is, therefore, is not useful for rapid re-provisioning. Under normal operating conditions, the DHCP lease is renewed and control goes back to steady state where periodic ranging continues at step 306. If the lease is not renewed, control goes back to step 302 and the modem goes through the power-on/self-test process again.

Another event that can occur at step 306 while the modem is in steady state is that the modem can receive an SNMP reset modem command from the provisioning system. Presently, if the modem user or network operator wanted to change the provisioning status of a modem, this is the approach taken. This is shown as a separate step or event in step 310. At step 310, the modem detects whether an SNMP reset modem command has been received. If such an event has not occurred, the modem continues normal operation, represented by step 306. If an SNMP reset command has been received, the modem returns to power-up/self-test shown in step 302. The modem then has a chance to re-provision as described above. This approach to changing provisioning status can take up to five minutes.

Figure 3B:
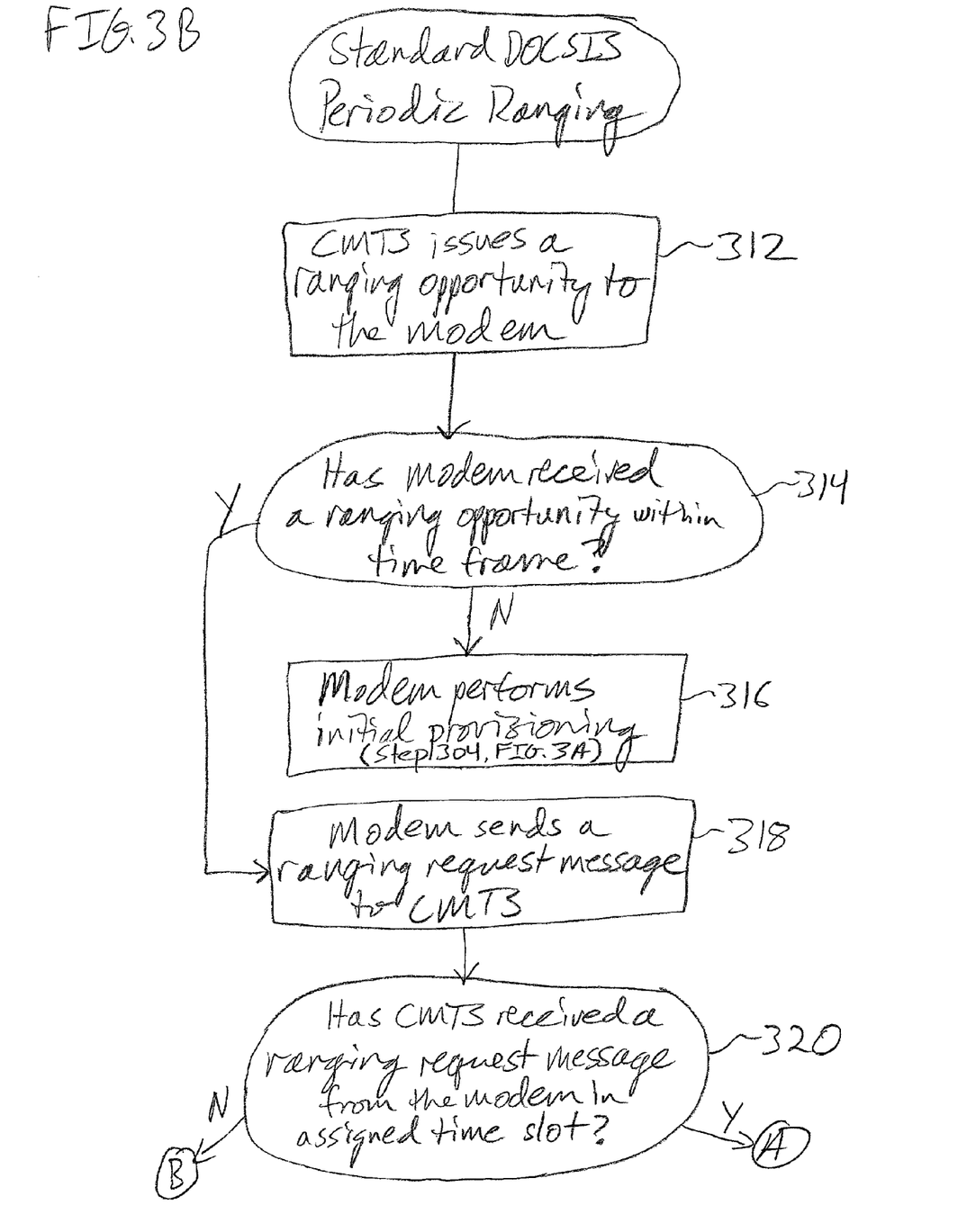
FIG. 3B is a flow diagram showing steps of standard DOCSIS periodic ranging.

FIG. 3B is a flow diagram showing steps of standard DOCSIS periodic ranging described briefly as step 306 of FIG. 3A. This occurs after initial provisioning (step 304) is complete. At a step 312 the CMTS issues a ranging opportunity (also referred to as a station maintenance interval message) to the cable modem. This message, issued by the CMTS, is a unicast message to each individual cable modem under its purview informing each cable modem of when each modem is expected to send a polling message to the CMTS. Each modem expects to get a ranging opportunity message from the CMTS at least once every 30 seconds. If a modem does not receive one within 30 seconds it performs a warm reboot.

At a step 314, the modem determines whether it has received a ranging opportunity message from the CMTS within the last 30 seconds. If not, control goes to a step 316 and the modem goes through initial provisioning (step 304) again. If it has, control goes to a step 318 where the cable modem sends a ranging request message (also referred to as a station maintenance message) to the CMTS as a response to the ranging opportunity message from the CMTS. In the described embodiment, the CMTS expects to receive a ranging response message from each cable modem within a certain time interval or slot, typically in the resolution of microseconds, to indicate that the cable modem is still online. This method of transmitting ranging request responses is referred to as time division multiple access (TDMA) and prevents the upstream transmission of one modem from colliding with upstream transmissions of other cable modems.

At a step 320, the CMTS determines whether a ranging request message was received from the cable modem during its assigned time slot. If a message was received a time-out counter is reset to zero at a step 322. Each cable modem has an associated time-out counter. It is a variable that is incremented every time the CMTS does not receive a ranging request message (a type of polling message) from the cable modem, i.e., there is a miss from the modem. The variable is reset to zero (or kept at zero) every time the CMTS receives such as a polling message, i.e., there is a hit. At a step 324 the CMTS sends a ranging response message to the cable modem. This is the same type of message sent to the cable modem at the end of initial provisioning. Control then goes back to step 312 where the CMTS continues to issue ranging opportunity messages (containing a station maintenance interval) to the cable modem and the cable modem periodic ranging continues.

At step 320, if the CMTS does not receive a ranging request message from the cable modem, the timeout counter is incremented, i.e., there is a miss, at a step 326. At a step 328, it is determined whether the time-out counter has exceeded a threshold (e.g. 16 consecutive misses according to DOCSIS standard). Because the time-out counter is reset to zero whenever there is a hit, there have to be consecutive misses to exceed the threshold value. If the threshold value has not been reached, the CMTS issues another ranging opportunity message to the cable modem, and the polling process continues. If the threshold value has been reached, communication between the CMTS and the cable modem is discontinued at a step 330. According to the DOCSIS RF protocol, when this happens the link between the CMTS and cable modem is considered terminated in a normal way.

As described above, part of the communication link protocol is polling messages (ranging opportunities, ranging requests, and ranging response messages) exchanged between a cable modem and a CMTS. Polling messages behave as heartbeats between the cable modem and a CMTS indicating that the cable modem is still enabled or alive. A CMTS instructs all cable modems it supports when to send it a polling message. That is, each cable modem is given a window of time within which it should send a polling message upstream to the CMTS. During that time frame, the CMTS expects to receive a message from a particular cable modem. If the CMTS does not receive a polling message from a cable modem for a threshold number of consecutive time frames, the CMTS assumes the connection between the cable modem and CMTS is lost. Similarly, if the modem does not receive a ranging opportunity message from the CMTS for more than 30 seconds, it will assume that the link has died.

As described above, with procedures presently in use, there are generally at least two ways to get a cable modem out of steady state or normal operation and thereby re-provisioning it. One is to break the periodic ranging chain by sending a modem reset command directly to the cable modem via a Layer 3 SNMP reset modem command, thereby forcing the modem to perform a cold reboot (go through the power-on/self-test process again). Another is allowing the modem's DHCP lease to expire. These two approaches take too much time to allow for true rapid or "on the fly" re-provisioning of a cable modem.

The present invention describes new ways of getting the modem out of steady state and straight to initial provisioning, thereby allowing the user to re-provision the modem much faster. With these new methods, the way in which the modem is re-provisioned has changed. Previously, a command was sent directly to the cable modem from the provisioning system. With the present invention, the command still originates from the provisioning system but is directed to the CMTS instead of the cable modem. Upon receiving the command, the CMTS affects the periodic ranging of a particular cable modem. More specifically, these new methods involve sending a "clear cable modem reset" command from the provisioning system to the CMTS (via SNMP). The CMTS then, in turn, causes a particular type of disruption in the periodic ranging of the cable modem (using the MAC address to identify the particular modem to be affected). These methods are described in FIGS. 4 and 5.

Figure 4:
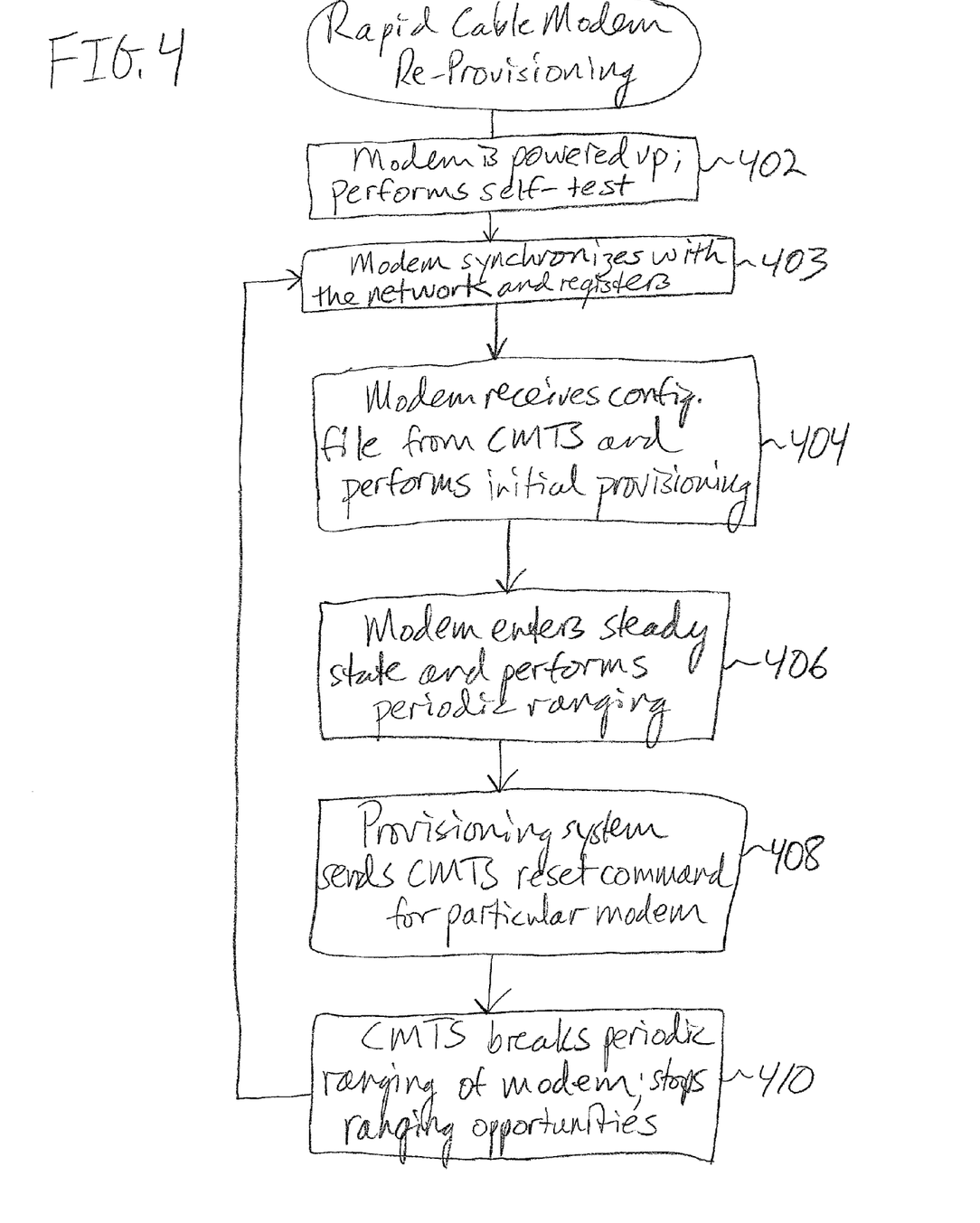
FIG. 4 is a flow diagram of a process for changing a provisioning status of a cable modem without requiring a power-on self-test in accordance with one embodiment of the present invention.

FIG. 4 is a flow diagram of a process for changing a provisioning status of a cable modem without requiring a power-on/self-test in accordance with one embodiment of the present invention. At a step 402 the cable modem is powered on and a self-test is performed as described in step 302 of FIG. 3A. As will be described below, in the rapid re-provisioning method of the present invention, this step is avoided. At a step 403 the modem synchronizes with the cable network and starts a registration procedure. At a step 404 the modem goes through initial provisioning as described above in step 304. Once initial provisioning is complete, the modem goes into a steady state and performs periodic ranging at a step 406.

Assuming that the network operator or modem user wants to change the provisioning status of a modem, a "clear cable modem reset" command, along with a MAC and IP address of a particular modem, is issued from the provisioning system to the CMTS at a step 408. This command is sent via a Layer 3 SNMP command to the CMTS. Once the CMTS receives this command, it breaks the periodic ranging chain of the particular modem, a Layer 1 function, at a step 410. More specifically, the CMTS stops sending ranging opportunity messages to the cable modem. As described in FIG. 3B, the modem expects a ranging opportunity message from the CMTS at least once every 30 seconds. If it does not receive one in that time frame, it will perform a warm boot. That is, it will go straight to synchronizing with the cable network and begin initial provisioning (step 304 of FIG. 3A) and can re-provision. This is shown by the arrow back to step 403.

Initial provisioning typically takes about 30 seconds, significantly reducing the time to recycle or re-provision the cable modem. It is during initial provisioning that a DOCSIS configuration file reflecting the desired, new provisioning status is sent to the modem. The cable modem can read this file and re-provision. Using this method, the cable modem is forced to respond in a different layer. The MAC/physical layer (Layer 1 and 2) of the modem is being affected instead of the IP layer (Layer 3).

In another preferred embodiment of the present invention, an RF failure is artificially introduced into the cable modem by the CMTS. When a modem experiences an RF failure it immediately goes straight to initial provisioning within a one to two second time frame. By going straight to initial provisioning, qualities such as the QAM carrier and upstream ID are not lost. Thus, it may be possible to continue receiving data on the downstream path.

Figure 5:
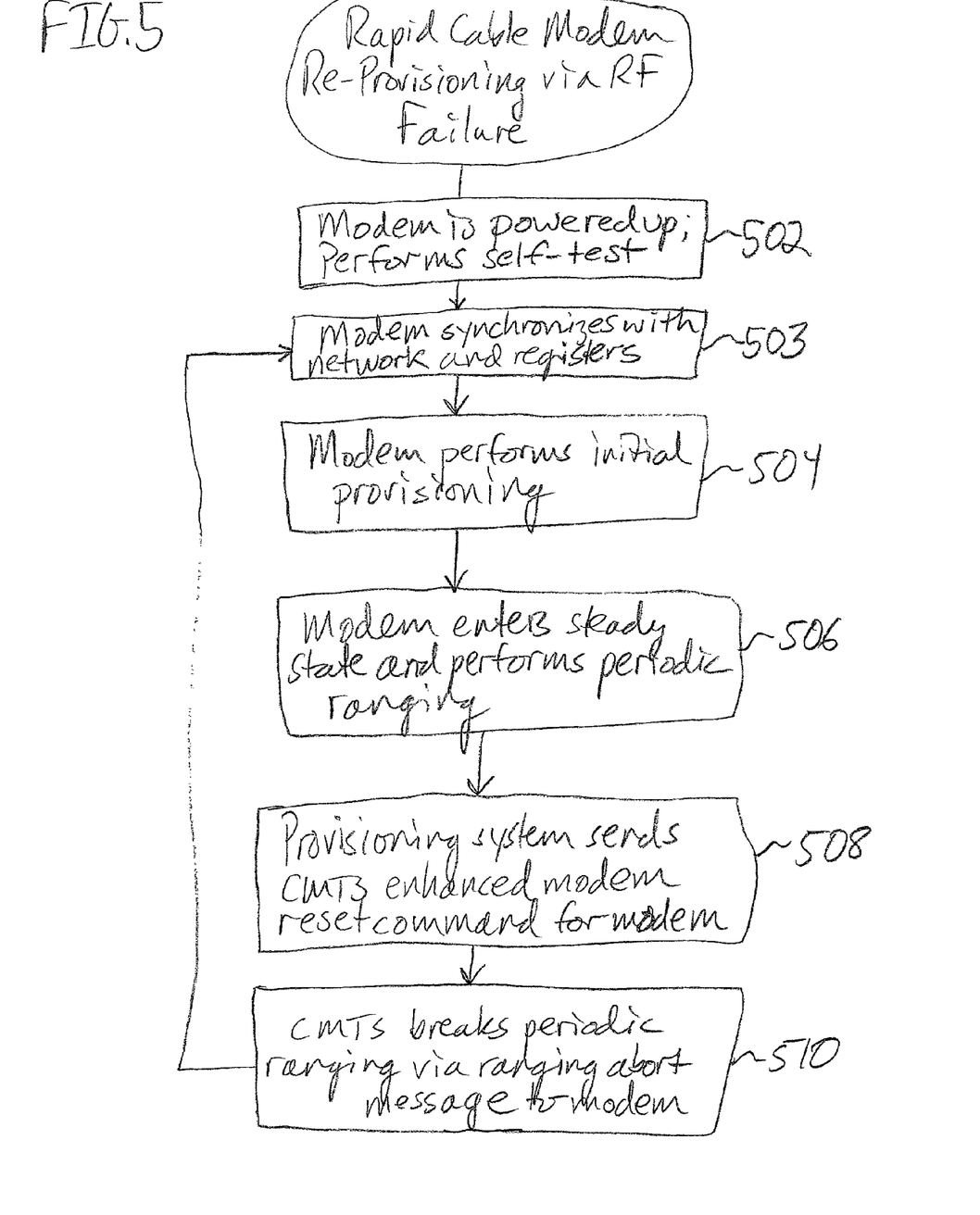
FIG. 5 is a flow diagram of a process for rapidly changing the provisioning status of a cable modem by declaring an unrecoverable RF failure in accordance with one embodiment of the present invention.

FIG. 5 is a flow diagram of a process for rapidly changing the provisioning status of a cable modem by declaring an unrecoverable RF failure in accordance with one embodiment of the present invention. This method can be used at any time, i.e., it is asynchronous, and, thus, is not tied to a particular function, such as periodic ranging.

At a step 502 the cable modem is powered up and a self-test is performed as described above. At a step 503 the modem synchronizes with the cable network and begins a registration process. At a step 504 the modem goes through initial provisioning. At step 506, the modem is in a steady state and performs periodic ranging. Assuming the modem user or the network operator wants to change the provisioning status of the modem, at a step 508 the provisioning system sends an enhanced "clear cable modem reset" command to the CMTS. Similar to the process of FIG. 4, the cable modem is effected by the CMTS instead of directly by the provisioning system. This enhanced reset command, along with a MAC address of the modem, sent to the CMTS causes the CMTS to break the periodic ranging of the cable modem at step 510. In this embodiment, the CMTS sends a ranging abort message to the cable modem instead of a ranging response message, as described in FIG. 3B. This ranging abort message causes the modem to have an unrecoverable RF failure, thereby breaking the periodic ranging chain and sending the modem back to network re-synchronization and initial provisioning (and avoiding the power-on/self-test test), shown by the arrow returning to step 503. This RF failure is not a true RF failure in the cable plant but rather an intentional and forced signal sent to the cable modem from the provisioning system via the CMTS.

The ranging abort message or command is normally sent when an upstream power or frequency error is out of tolerance. It has not been used in a situation where the provisioning status of a cable modem needs to be changed. By using this message instead of a normal ranging response message during periodic ranging, the modem can drop offline in about one second. In this case, the modem does not have to wait the minimum 30 seconds to realize it has not received a ranging opportunity message from the CMTS. With the processes described in FIGS. 4 and 5, the disruption to the customer is minimal and it is possible for the customer to be kept online at all times.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. In a cable modem termination system (CMTS), a method of changing the provisioning status of a selected cable modem in a cable modem network having a provisioning system, the method comprising:
    transmitting a first configuration file to the selected cable modem thereby allowing the selected cable modem to initially provision and perform a self-test;
    performing periodic ranging between the selected modem and the CMTS operating in a primary hub of a cable television plant; and
    causing a change in provisioning status of the selected cable modem by performing one of:
        i) deliberately interrupting the periodic ranging at the MAC/physical layer of the cable modem network by the CMTS receiving a clear modem reset command directly from the provisioning system via simple network management protocol (SNMP) and the CMTS causing a disruption in the periodic ranging with the selected cable modem, thereby causing the selected cable modem to return to a synchronization process with the cable modem network and causing the selected cable modem to receive a second configuration file; and
        ii) transmitting a ranging abort message to the selected cable modem thereby deliberately causing the cable modem to have an RF failure, wherein the RF state of the cable plant is intact and the ranging abort message is a forced signal sent to the cable modem from the CMTS upon instructions from the provisioning system via SNMP;
    wherein a power-on state of the cable modem is maintained during the periodic ranging interruption process and the RF failure process and the self-test performed during initial provisioning is relied on by the cable modem.

2. A method as recited in claim 1 further comprising receiving a first reset command from the provisioning system associated with the cable modem network.

3. A method as recited in claim 2 further comprising receiving the first reset command thereby causing the CMTS to interrupt the periodic ranging between the CMTS and the selected cable modem.

4. A method as recited in claim 3 wherein interrupting the periodic ranging further comprises discontinuing the transmission of a ranging opportunity message to the selected cable modem.

5. A method as recited in claim 1 wherein interrupting the periodic ranging further comprises causing the selected cable modem to bypass a power-on/self-test phase.

6. A method as recited in claim 1 further comprising sending the second configuration file to the cable modem after the selected cable modem resynchronizes with the cable modem network.

7. A method as recited in claim 1 further comprising receiving a second reset command from a provisioning system associated with the selected cable modem network.

8. A method as recited in claim 7 further comprising receiving the second reset command thereby causing the CMTS to interrupt the periodic ranging between the CMTS and the selected cable modem.

9. A method as recited in claim 8 wherein interrupting the periodic ranging further comprises sending a ranging abort message to the selected cable modem.

10. A method as recited in claim 9 further comprising replacing a ranging response message with the ranging abort message during the periodic ranging wherein the ranging abort message causes a radio frequency (RF) failure in the selected cable modem.

11. A method as recited in claim 10 further comprising resynchronizing the selected cable modem with the cable modem network immediately upon the selected cable modem receiving the ranging abort message.

12. A method as recited in claim 1 wherein the second configuration file contains data to be used to re-provision the selected cable modem.

13. A method as recited in claim 1 wherein the selected cable modem is a DOCSIS-compliant modem.

14. A computer-readable medium containing programmed instructions arranged to change the provisioning status of a selected cable modem in a cable modem network having a cable modem termination system (CMTS) and a provisioning system, the computer-readable medium including programmed instructions for:
    transmitting a first configuration file to the selected cable modem thereby allowing the selected cable modem to initially provision and perform a self-test;
    performing periodic ranging between the selected modem and the CMTS operating in a primary hub of a cable television plant; and causing a change in provisioning status of the selected cable modem by performing one of:
  i) deliberately interrupting the periodic ranging at the MAC/physical layer of the cable modem network by the CMTS receiving a clear modem reset command directly from the provisioning system via simple network management protocol (SNMP) and the CMTS causing a disruption in the periodic ranging with the selected cable modem, thereby causing the selected cable modem to return to a synchronization process with the cable modem network and causing the selected cable modem to receive a second configuration file; and
  ii) transmitting a ranging abort message to the selected cable modem thereby deliberately causing the cable modem to have an RF failure, wherein the RF state of the cable plant is intact and the ranging abort message is a forced signal sent to the cable modem from the CMTS upon instructions from the provisioning system via SNMP;
wherein a power-on state of the cable modem is maintained during the periodic ranging interruption process and the RF failure process and the self-test performed during initial provisioning is relied on by the cable modem.

15. A computer-readable medium as recited in claim 14 further comprising programmed instructions for receiving a first reset command from a provisioning system associated with the cable modem network.

16. A computer-readable medium as recited in claim 15 further comprising programmed instructions for receiving the first reset command thereby causing the CMTS to interrupt the periodic ranging between the CMTS and the selected cable modem.

17. A computer-readable medium as recited in claim 16 wherein the programmed instructions for interrupting the periodic ranging further comprises programmed instructions for discontinuing the transmission of a ranging opportunity message to the selected cable modem.

18. A computer-readable medium as recited in claim 16 wherein the programmed instructions for interrupting the periodic ranging further comprises programmed instructions for sending a ranging abort message to the selected cable modem.

19. A cable modem termination system (CMTS) capable of changing the provisioning status of a selected cable modem in a cable modem network having a provisioning system, the system comprising:
  a processor; and
  a computer-readable medium storing a program for execution by the processor, the program comprising
  computer code that transmits a first configuration file to the selected cable modem thereby allowing the selected cable modem to initially provision and perform a self-test;
  computer code that performs periodic ranging between the selected modem and the CMTS operating in a primary hub of a cable television plant; and
  computer code that causes a change in provisioning status of the selected cable modem by performing one of:
    i) deliberately interrupting the periodic ranging at the MAC/physical layer of the cable modem network by the CMTS receiving a clear modem reset command directly from the provisioning system via simple network management protocol (SNMP) and the CMTS causing a disruption in the periodic ranging with the selected cable modem, thereby causing the selected cable modem to return to a synchronization process with the cable modem network and causing the selected cable modem to receive a second configuration file; and
    ii) transmitting a ranging abort message to the selected cable modem thereby deliberately causing the cable modem to have an RF failure, wherein the RF state of the cable plant is intact and the ranging abort message is a forced signal sent to the cable modem from the CMTS upon instructions from the provisioning system via SNMP;
  wherein a power-on state of the cable modem is maintained during the periodic ranging interruption process and the RF failure process and the self-test performed during initial provisioning is relied on by the cable modem.

20. A cable modem termination system (CMTS) capable of changing the provisioning status of a selected cable modem in a cable modem network having a provisioning system, the CMTS comprising:
  a means for transmitting a first configuration file to the selected cable modem thereby allowing the selected cable modem to initially provision and perform a self-test;
  a means for performing periodic ranging between the selected modem and the CMTS operating in a primary hub of a cable television plant; and
  means for causing a change in provisioning status of the selected cable modem by performing one of:
    i) deliberately interrupting the periodic ranging at the MAC/physical layer of the cable modem network by the CMTS receiving a clear modem reset command directly from the provisioning system via simple network management protocol (SNMP) and the CMTS causing a disruption in the periodic ranging with the selected cable modem, thereby causing the selected cable modem to return to a synchronization process with the cable modem network and causing the selected cable modem to receive a second configuration file; and
    ii) transmitting a ranging abort message to the selected cable modem thereby deliberately causing the cable modem to have an RF failure, wherein the RF state of the cable plant is intact and the ranging abort message is a forced signal sent to the cable modem from the CMTS upon instructions from the provisioning system via SNMP;
  wherein a power-on state of the cable modem is maintained during the periodic ranging interruption process and the RF failure process and the self-test performed during initial provisioning is relied on by the cable modem.

21. A CMTS as recited in claim 20 further comprising a means for receiving a first reset command from the provisioning system associated with the cable modem network.

22. A CMTS as recited in claim 21 further comprising a means for receiving the first reset command thereby causing the CMTS to interrupt the periodic ranging between the CMTS and the selected cable modem.

23. A CMTS as recited in claim 22 wherein interrupting the periodic ranging further comprises discontinuing the transmission of a ranging opportunity message to the selected cable modem.

24. A CMTS as recited in claim 20 further comprising a means for sending the second configuration file to the cable modem after the selected cable modem resynchronizes with the cable modem network.

25. A CMTS as recited in claim 20 further comprising a means for receiving a second reset command from a provisioning system associated with the selected cable modem network.

26. A CMTS as recited in claim 25 further comprising a means for receiving the second reset command thereby interrupting the periodic ranging between the CMTS and the selected cable modem.

27. A CMTS as recited in claim 26 wherein means for interrupting the periodic ranging further comprises a means for sending a ranging abort message to the selected cable modem.

28. A CMTS as recited in claim 27 further comprising a means for replacing a ranging response message with the ranging abort message during the periodic ranging wherein the ranging abort message causes a radio frequency (RF) failure in the selected cable modem.

* * * * *